United States Patent

[11] 3,575,549

[72] Inventors Charles F. Hepner
Chicago, Ill.;
David L. Zahn, Milwaukee, Wis.

[21] Appl. No. 858,660
[22] Filed Sept. 17, 1969
[45] Patented Apr. 20, 1971
[73] Assignee Zenith Radio Corporation
Chicago, Ill.

[54] HUE CONTROL CIRCUIT
9 Claims, 11 Drawing Figs.

[52] U.S. Cl. 178/5.4HE
[51] Int. Cl. H04n 9/44
[50] Field of Search 178/5.4 (HE), 5.4, 69.5 (CD), 5.4 (SD); 333/(Inquired); 332/16 (T); 307/295, 282

[56] References Cited
UNITED STATES PATENTS

| | | | |
|---|---|---|---|
| 2,881,245 | 4/1959 | Fenton et al. | 178/5.4HE |
| 3,436,470 | 4/1969 | Konkel et al. | 178/5.4HE |
| 3,454,708 | 7/1969 | Curtis et al. | 178/5.4HE |

*Primary Examiner*—Richard Murray
*Assistant Examiner*—Richard P. Lange
*Attorneys*—Francis W. Crotty and Cornelius J. O'Connor

ABSTRACT: A phase shifting network for changing the phase of the chrominance signal or the reference signal to adjust the hue content of the reproduced image in a color television receiver. The receiver includes a demodulator coupled to a source of chrominance signal and to a source of color reference signal. The phase shifting network comprises a signal translating circuit in the form of a transistor having a base input terminal and emitter and collector output terminals. The chrominance signal source is coupled to the base input terminal so that a first output signal is developed at the emitter and a second output signal, substantially opposite the phase to the first output signal, is developed at the collector. A phase shift circuit comprising a resistor and a tunable inductance varactor combination, in parallel, are coupled across the emitter and collector and respond to the output signals to derive a wave signal at the junction of the resistor and the inductance varactor combination. The effective reactance contributed by the varactor to the phase shift circuit is adjustable so as to permit a selective shift of the phase of the derived signal relative to the applied signal.

Inventors
Charles F. Hepner
David L. Zahn
By Cornelius J. O'Connor
Attorney

Inventors
Charles F. Hepner
David L. Zahn
By [signature]
Attorney

HUE CONTROL CIRCUIT

BACKGROUND OF THE INVENTION

This invention relates in general to phase shifting arrangements and in particular to a phase shifting network for use as a hue control in a color television receiver.

In accordance with standards prescribed by the Federal Communications Commission governing television transmissions, a transmitted color television signal features a composite television signal comprising a luminance component, a chrominance component and a synchronizing reference burst component. The luminance component carries information relating to the brightness of the telecast image and is transmitted as an amplitude modulated carrier component. In this regard the luminance component is similar to the video signal employed in monochrome transmissions thus enabling a monochrome receiver to respond to the luminance component and reproduce the telecast image in black and white. Chrominance or color information is borne by a 3.58 MHz subcarrier which is amplitude modulated to convey the degree of color saturation and phase modulated in accordance with hue content i.e., color tint.

The color sync bursts are present only during a color telecast and are transmitted during the blanking intervals for the horizontal scansion lines to afford a means for reconstructing a reference signal at the receiver. This signal is then employed in demodulating the chrominance subcarrier.

The luminance component is demodulated by a conventional AM detector, amplified and applied to three electrodes, conventionally the cathodes, of the receiver's image reproducer, which in practice takes the form of a three gun tricolor shadow mask cathode-ray tube. A separate channel is generally employed for processing the chrominance and synchronizing burst components. Specifically, color control signals in the form of color difference signals are most conveniently developed by applying the chrominance component and the locally generated color reference signal to a synchronous demodulator stage. Three color control signals, commonly designated R—Y, B—Y and G—Y, are derived from the demodulator and applied individually to three different control grids of the cathode-ray tube to reconstitute, in conjunction with the luminance component, the transmitted color image.

In reconstructing the reference signal at the receiver the role of the synchronizing bursts is to provide reference phase information. It is necessary, of course, that the locally generated reference signal be in phase with the transmitted subcarrier in order that the hue of the reproduced image be true. Since some phase delay or distortion of the color signals during transmission or processing can be expected, it is desirable, if not necessary, to provide the viewer with a control to readjust the phase of the chrominance signal or the reference signal if true color reproduction is to be attained. There is also the consideration that, insofar as hue is concerned, personal tastes of individual viewers vary considerably thus further contributing to the desirability of a hue control.

A typical prior art approach to hue control contemplates inserting an RC (resistor-capacitor) phase shifting network in the chrominance signal channel or associating such a network with the reference signal oscillator. In operation the value of the resistor or capacitor is adjusted to effect a phase shift of the chrominance signal, or the reference signal, prior to application of that signal to the color demodulator. In this fashion the phase of the chrominance signal relative to the reference signal, or vice versa, can be adjusted to compensate for a phase distortion and/or to change the hue to suit the taste of the viewer.

In practice the hue control is mounted for ready access to the viewer and therefore is physically spaced from the color signal circuit upon which it operates. Now since the control is manually actuated, it is necessary to employ some means to prevent stray pickup or other interference from disturbing the color signal circuits. In current practice a length of shielded cable is employed, an expensive but necessary component in prior art hue controls.

Another consideration in the matter of hue control is the degree of phase shift attainable by the phase shifting network. It is generally acknowledged that, practically, not more than 120° of phase shift can be realized with known hue control circuits.

SUMMARY OF THE INVENTION

Accordingly, it is a general object of the invention to provide an improved hue control for a color television receiver.

It is another object of the invention to provide a viewer operated hue control which does not disturb the color signal circuits in a color television receiver.

It is also an object of the invention to provide a hue control for effecting a substantially greater degree of phase shift than that attainable with prior art circuits.

It is still another object of the invention to provide an inexpensive viewer operated hue control for a color television receiver which avoids the shortcomings of prior art controls.

In accordance with the invention, a phase shifting network is provided for a color television receiver having means responsive to a received composite color television signal for reconstituting a color image. The composite signal comprises a color subcarrier component which is modulated with chrominance information. The receiver means includes a demodulator which is coupled to a source of chrominance signal and to a source of color reference signal for developing a color control signal. The phase shifting network serves to change the phase of either the chrominance signal or the reference signal to adjust the hue content of the reconstituted image. This phase shifting network comprises a signal translating circuit which has an input terminal and a pair of output terminals. Means are provided for coupling either the chrominance signal source or the color reference signal source to the input terminal of the signal translating circuit to apply a signal thereto, and to develop first and second oppositely phased output signals at the respective output terminals. A phase shift circuit, which comprises a resistor and a reactance means coupled across the output terminals of the signal translating circuit, derives a wave signal at the junction of the resistor and the reactance means in response to the output signals of the signal translating circuit. The reactance means comprises an inductance and a capacitor combination which is tunable near the frequency of the color subcarrier. Tuning means are provided for changing the effective reactance contributed by the reactance means to the phase shift circuit in order to selectively shift the phase of the derived wave signal relative to the signal applied to the signal translating circuit. Finally, means are provided for coupling the derived wave signal to the demodulator.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several FIGS. of which like reference numerals identify like elements, and in which:

DESCRIPTION OF THE PREFERRED EMBODIMENT

Figure 1:
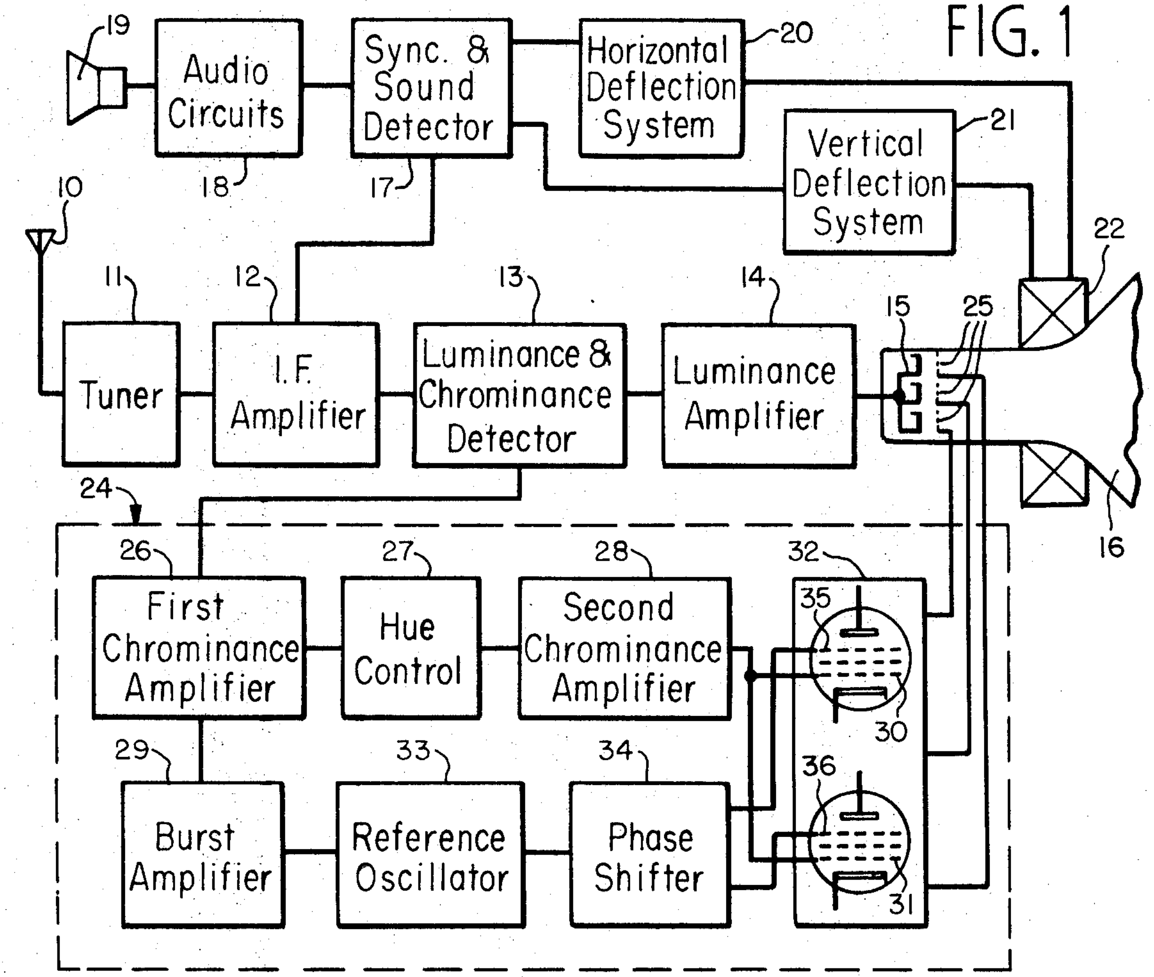
FIG. 1 is a block diagram of a color television receiver illustrating one utilization of a hue control constructed in accordance with the invention.

With the exception of certain circuitry in the chrominance channel, which will subsequently be described, the television receiver depicted in FIG. 1 is essentially conventional in design and therefore only a brief description of its structure and operation is deemed necessary. A received signal is intercepted by antenna 10 and coupled in a conventional manner to a tuner 11, which includes the usual radio frequency amplifying and heterodyning stages for developing an intermediate frequency (IF) signal. After amplification by IF amplifier 12 the signal is applied to a luminance and chrominance detector 13, wherein luminance and chrominance information, in the form of a composite signal, is derived. The luminance component of the composite signal is amplified in amplifier 14 and applied to the cathodes 15 of a three gun color image reproducing cathode-ray tube 16.

The output of intermediate frequency amplifier 12 is also applied to a sound and sync detector 17 which derives both sound and synchronizing components. The sound components are applied to audio circuits 18 wherein conventional sound demodulation and amplification takes place to develop an audio output signal suitable for driving speaker 19. Synchronizing information, in the form of horizontal and vertical sync pulses, is applied to horizontal and vertical deflection systems 20, 21, respectively, which generate sawtooth scanning signals for driving the deflection yoke 22 mounted upon the neck portion of cathode-ray tube 16.

The chrominance components of the composite output signal of detector 13 are processed by a chrominance channel 24 which develops three color difference signals for application to assigned ones of control electrodes 25 included in the beam generating guns of cathode-ray tube 16. Since the electron beams are simultaneously modulated by the luminance information applied to cathodes 15 and by the chrominance information coupled to grids 25, the deflection of these beams by the horizontal and vertical deflection systems serves to reproduce a color image upon the viewing screen of cathode-ray tube 16.

Referring now with more particularity to chrominance channel 24, this stage is seen to comprise a source of chrominance signal in the form of a first amplifier 26 the output of which is translated by a hue control 27 constructed in accordance with the invention. Hue control 27, the structure and operation of which is detailed below, comprises a phase shift network that alters the phase of the chrominance signal received from amplifier 26 and then applies it to a second chrominance amplifier 28. The output of amplifier 28 is concurrently applied to the control grids 30, 31 of a pair of pentodes that comprise a portion of a synchronous demodulator 32 which can be of a known type such as the one described in copending U.S. Pat. application Ser. No. 627,685 which was filed on Apr. 3, 1967 in the name of Robert Krug and assigned to the same assignee as the subject invention.

First chrominance amplifier 26 also includes a circuit responsive to synchronizing bursts of subcarrier frequency borne by the chrominance signal. Sync bursts derived by that circuit are applied through a burst amplifier 29, gated in known fashion by a signal from the deflection circuitry, to a reference oscillator 33 which includes a suitable phase comparison circuitry for generating a 3.58 MHz continuous wave demodulation signal synchronized in phase and frequency to the reference burst. The output of reference oscillator 33 is applied to a phase shifter 34 which derives a pair of phase displaced reference signals for application to the suppressor grids 35, 36 of the pentode devices included in synchronous demodulator 32. The manner in which demodulator 32 develops three color difference signals from the chrominance signal and the two phase displaced reference signals is fully described in the aforementioned copending Krug application and therefore will not be reviewed here.

Figure 2:
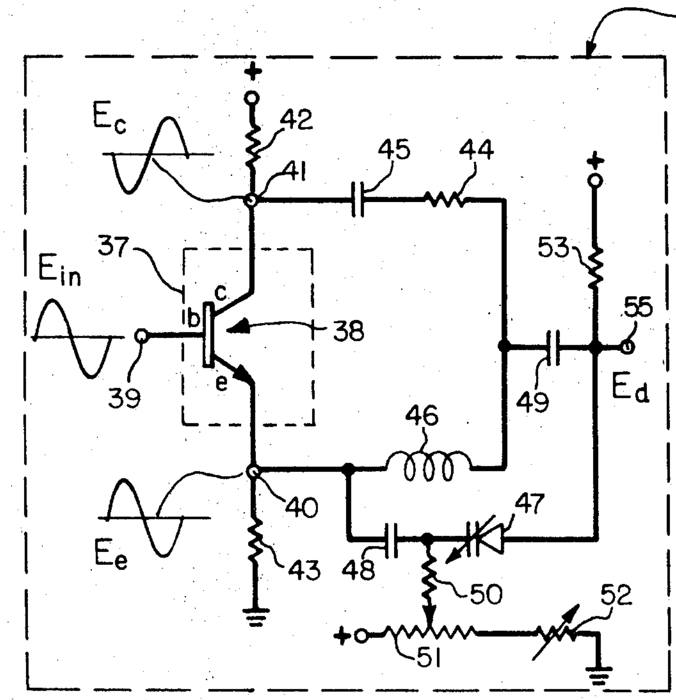
FIG. 2 is a detailed schematic diagram of a preferred phase shifting network for use as the hue control in the television receiver of FIG. 1.

Attention is now directed to the schematic diagram of FIG. 2 in which one embodiment of a hue control phase shifting network is illustrated. More particularly, network 27 comprises a signal translating circuit 37 having an input terminal 39 and a pair of output terminals 40, 41. As disclosed, circuit 37 comprises a NPN transistor device 38 with its base coupled to input terminal 39 and its emitter and collector coupled to output terminals 40, 41, respectively. It is a function of signal translating circuit 37 to derive a pair of oppositely phased output signals from an applied input signal; therefore, it should be appreciated that signal translating circuit 37 can comprise an arrangement other than a transistor, for example, an electron tube or even a transformer having a tapped winding.

In any event, input terminal 39 is coupled to an output of first chrominance amplifier 26, output terminal 41 is connected through resistor 42 to a source of positive potential while output terminal 40 is returned to a plane of reference potential or ground via resistor 43. In this circuit arrangement, therefore, a chrominance signal applied to terminal 39 develops a first output signal at terminal 40 which is substantially in phase with the applied input signal at terminal 39 and a second output signal at terminal 41 having a phase substantially opposite to that of the applied signal, all as clearly shown by the waveforms appearing in FIG. 2. Preferably, the amplitudes of the output signals at terminals 40 and 41 are equal. This is most readily achieved by operating transistor 38 at unity gain and by making the emitter and collector impedances 43 and 42 of equal value. Moreover, insofar as the relative phase relationships between the input and output signals are concerned it is only necessary, for the purposes of the invention, that the two output signals be oppositely phased, their individual phasal relation to the applied input signal being no consequence.

Network 27 further includes a phase shift circuit comprising a resistor 44, which is coupled to output terminal 41 by a coupling capacitor 45, and an LC reactance means which together with resistor 44 are coupled across output terminals 40, 41. Specifically, the LC reactance means comprises inductance 46 and a voltage controlled variable capacitance 47, for example, a varactor. Inductance 46 and varactor 47, which are effectively connected in parallel by the coupling capacitors 48, 49, are assigned values such that they form a resonant circuit tunable near or through the frequency of the 3.58 MHz chrominance subcarrier signal. The cathode of the varactor is connected through a biasing resistor 50 to the adjustable arm of a potentiometer 51 which can comprise a viewer operated control. The upper terminal of potentiometer 51 is connected to a source of positive potential while its lower terminal is returned to reference potential through a variable resistor 52 that serves as a range control. The anode of varactor 47 is also connected to a source of positive potential, via resistor 53.

Resistor 44 and the parallel combination of inductor 46 and varactor 47 are responsive to the output signals appearing at terminals 41 and 40 to the end that a wave signal is derived at terminal 55, a junction effectively between resistor 44 and the LC combination. Potentiometer 51 comprises a DC tuning means for the LC combination by virtue of the fact that it controls the DC biasing potential applied across varactor 47 and thus the capacitance exhibited by that device. Adjustment of potentiometer 51, after range control 52 is set, thus serves to change the resonant frequency of the LC combination and thereby selectively shift the phase of the wave signal derived at junction 55 relative to the phase of the signal applied to input terminal 39, all in the manner detailed below. Finally, means which include terminal 55 and second chrominance amplifier 28 are provided for coupling the derived phase altered signal to the control grids 30, 31 of the synchronous demodulator pentodes.

In effect the function of phase shifting network 27 is to alter the phase of the chrominance signal prior to its application to the synchronous demodulator. Since, as previously noted, the output of reference oscillator 33 is locked in phase with the transmitted subcarrier through control circuitry that utilizes the synchronizing burst signals, any deviation in phase of the chrominance signal, subsequent to its transmission, is manifested as improper hue content in the reproduced color image and can be compensated for by shifting the phase of the chrominance signal with hue control network 27, specifically, by adjusting potentiometer 51.

Figure 3A:
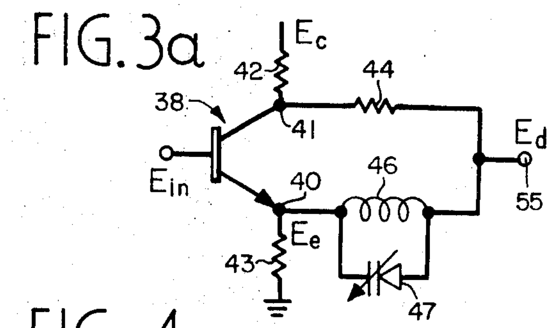
FIGS. 3*a* and 3*b* are, respectively, an equivalent diagram of the phase shifting network of FIG. 2 and an explanatory voltage vector diagram helpful in an understanding of the operation of the invention.
Figure 3B:
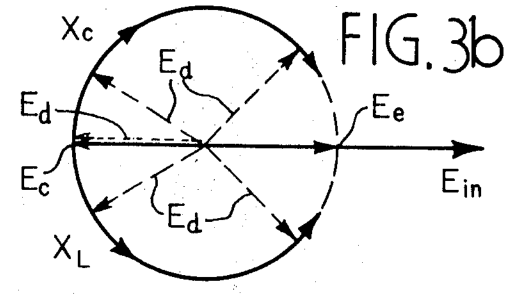

Attention is now directed to FIGS. 3*a* and 3*b* which illustrate the hue control circuit of FIG. 2 in an equivalent form and an explanatory vector diagram. As indicated by the waveforms appearing in FIG. 2, the output signals at the emitter and collector terminals of the transistor are 180° out of phase, which relationship is illustrated by the oppositely directed vectors $E_e$ and $E_c$ in FIG. 3*b*, with the former in phase with the subcarrier input signal $E_{in}$. Assuming, for the moment, that the parallel LC combination is tuned to resonate at the frequency of the subcarrier input $E_{in}$, then a very high impedance is established between terminals 40 and 55. As a result the wave signal $E_d$ derived at junction 55 has the same amplitude and exhibits substantially the same phase as the collector signal $E_c$. Now if the capacitance of varactor 47 is made smaller, as by adjusting potentiometer 51 to change the bias thereacross, the circuit resonates at a higher frequency. The LC combination now constitutes an inductive reactance, insofar as the 3.58 MHz input signal $E_{in}$ is concerned, and the derived signal $E_d$ constitutes the vector sum of the signals developed across resistor 44 and the LC combination 46, 47. As a result, the phase of signal $E_d$ shifts in a counterclockwise direction, as indicated by the curved arrows in FIG. 3*b*. In the limiting condition, where C47 is reduced to zero, the phase of signal $E_d$ approaches that of the emitter signal $E_e$. It should also be noted that reducing the value of inductor 46 will produce the same type of phase shift as is obtained by reducing the capacitance of varactor 47.

On the other hand, if C47 is made larger in value, the circuit resonates at a lower frequency and the LC combination presents a capacitive reactance to the 3.58 MHz signal. Again the derived signal $E_d$ constitutes the vector sum of the signals developed across resistor 44 and the LC combination 46, 47, but now the phase of signal $E_d$ shifts in a clockwise direction, as shown in FIG. 3*b*. As C47 is made substantially larger than L46, a limiting condition is again reached where the phase of signal $E_d$ again approaches that of the emitter signal $E_e$. By the same token, increasing the value of L46 will also produce the same type of phase shift as increasing C47.

From the foregoing analysis it is apparent that the phase of the derived signal $E_d$, relative to the applied signal $E_{in}$, is variable over a range substantially greater than 180°, approaching, in fact, a total phase shift in excess of 270° by adjusting resistor 51. Moreover, the amplitude of signal $E_d$ remains substantially constant throughout this range of phase shift. Such a phase shifting network has been constructed in accordance with the schematic diagram of FIG. 2 and has been found to give very satisfactory performance; merely by way of illustration and in no sense by way of limitation, some of the circuit parameters for that phase shifting network are as follows:

| | |
|---|---|
| B+ | 22 volts |
| NPN Transistor 38 | MPS-6521 |
| Varactor 47 | 1N3182 |
| Inductor 46 | 93.5 $\mu h$ |
| Resistor 42 | 330 ohms |
| Resistor 43 | 330 ohms |
| Resistor 44 | 3,300 ohms |
| Resistor 50 | 100,000 ohms |
| Resistor 51 | 100,000 ohms |
| Resistor 52 | 200,000 ohms |
| Resistor 53 | 100,000 ohms |
| Capacitor 48 | 1,500 pfd. |
| Capacitor 45 | 2,200 pfd. |
| Capacitor 49 | 1,000 pfd. |

Figure 4A:
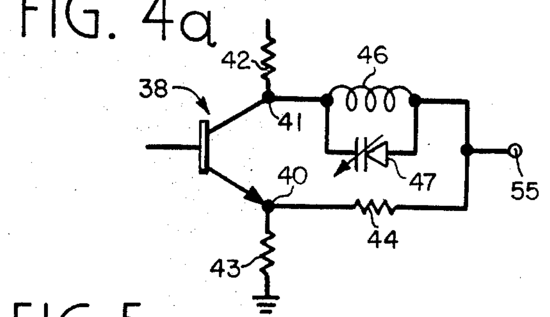
FIGS. 4a and 4b are, respectively, an equivalent diagram of a different arrangement of the phase shifting network of FIG. 2 and an explanatory voltage vector diagram.
Figure 4B:
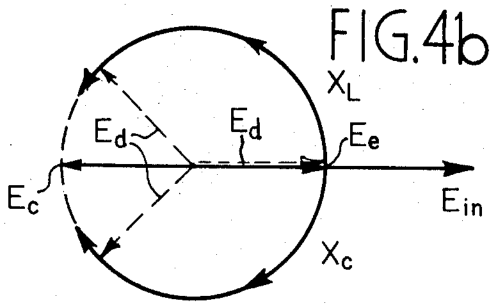

FIG. 4*a* illustrates another arrangement of the hue control phase shift network of FIGS. 2 and 3*a*. The only significant difference resides in the fact that the resistor 44 and the components of the LC combination 46, 47 have been interchanged in the output circuit of transistor 38. In this arrangement, when the LC combination is tuned at or near the resonant frequency of the input signal $E_{in}$, the derived signal $E_d$ is in phase with the emitter output signal $E_e$. As the capacitance of varactor 47 is reduced, the derived signal $E_d$ again constitutes the vector sum of the signals developed across resistor 44 and the LC combination and the phase of signal $E_d$ shifts in a counterclockwise direction, as indicated by the arrows in FIG. 4*b*. By the same token, an increase in the capacity exhibited by varactor 47 produces a phase shift in the opposite direction, i.e. in a clockwise direction. In all other respects, the circuit of FIG. 4*a* performs in substantially the same fashion as that of the principal embodiment of FIG. 3*a*.

It has further been determined that the objects of the invention can be achieved if the LC combination is arranged as a series resonant circuit rather than as a parallel resonant circuit. More particularly, and with reference to FIG. 5*a* in which components corresponding to those employed in the principal embodiment are identified by like primed reference numerals, inductor 46′ is serially arranged with a varactor 47′ together with a resistor 44′ across the emitter collector terminals 40′, 41′ of transistor 38′. An output terminal 55′, at which the derived signal $E'_d$ is developed, is established at the junction of resistor 44′ and varactor 47′.

Figure 5A:
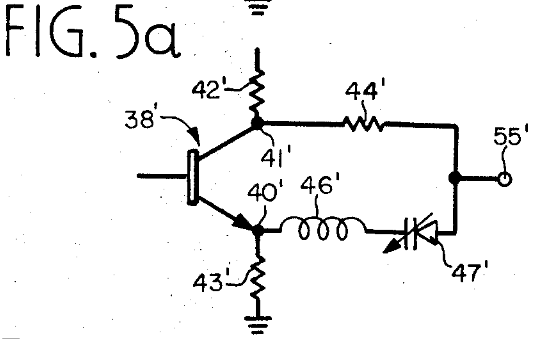
FIGS. 5a and 5b are, respectively, an equivalent diagram of an alternate embodiment of the invention and an explanatory voltage vector diagram.
Figure 5B:
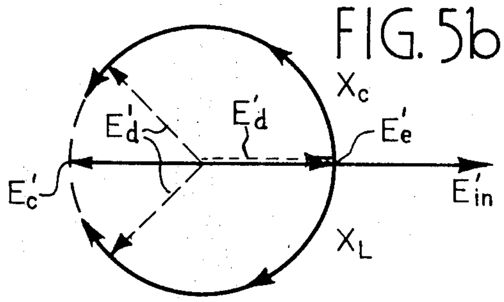

In the series arrangement of the phase shift circuit shown in FIG. 5*a* and with inductor 46′ and varactor 47′ adjusted for a series resonant condition, the derived signal $E'_d$ is, as indicated in FIG. 5*b*, in phase with the emitter voltage $E'_e$ and the input signal $E'_{in}$. As the capacitance of varactor 47 is reduced then the series LC combination assumes a capacitive reactance and the phase of the output signal $E'_d$ is shifted in a counterclockwise direction as indicated in FIG. 5*b*. On the other hand, increasing the capacitance of varactor 47′ varies the phase of the derived signal $E'_d$ in a clockwise direction. In an actual circuit constructed in accordance with FIG. 5*a* a phase shift in excess of 180° was achieved. Some of the circuit parameters for that circuit were as follows:

| | |
|---|---|
| Transistor 38′ | MPS 6521 |
| Resistor 42′ | 330 ohms |
| Resistor 43′ | 330 ohms |
| Resistor 44′ | 2,200 ohms |
| Inductor 46′ | 60 $\mu h$ |
| Varactor 47′ | 1N3182 |

Again the above parameters are given merely by way of illustration and in no sense by way of limitation.

Figure 6A:
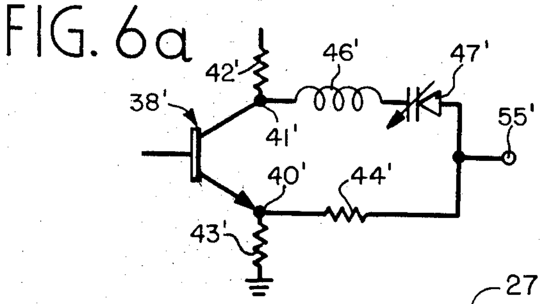
FIGS. 6a and 6b are, respectively, an equivalent diagram of a different arrangement of the phase shift network of FIG. 5a and an explanatory voltage vector diagram.
Figure 6B:
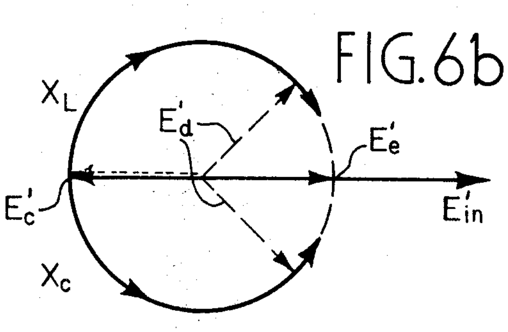

It is also recognized that resistor 44′ and resonant circuit 46′, 47′ can be interchanged in the emitter collector outputs of transistor 38′ as per FIG. 6*a*. In this arrangement a series resonant condition of circuit 46′, 47′ establishes that the derived signal $E_d$ is substantially in phase with the collector signal $E'_c$. Again, and as noted in FIG. 6*b*, reducing the capacitance value of varactor 47′ shifts the phase of the derived signal $E'_d$ in a counterclockwise direction while increasing the capacitance value of varactor 47′ shifts the phase of the derived signal in a clockwise direction.

Figure 7:
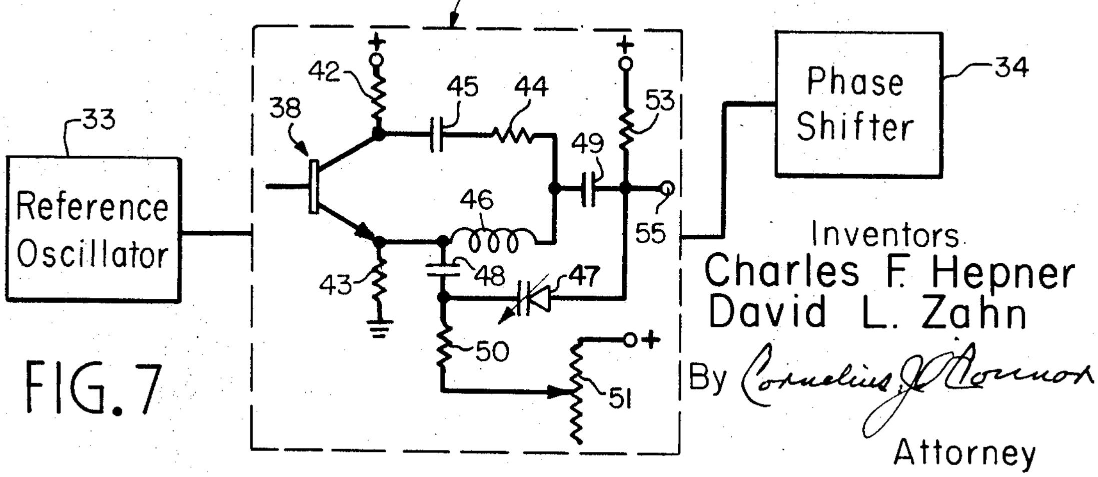
FIG. 7 is a block diagram, partially schematic, of a portion of the color television receiver of FIG. 1 but illustrating a different utilization of a hue control constructed in accordance with the invention.

It is further appreciated that the hue control 27 in the chrominance channel 24 can be employed other than in association with a chrominance amplifier. More particularly, and with reference to FIG. 7, it is shown that the hue control 27 can be inserted between the reference oscillator 33 and the phase shifter 34 in order to shift the phase of the oscillator signal itself. In this fashion the phase of the oscillator signal, relative to that of the chrominance subcarrier signal is shifted in order to compensate for any phase distortion suffered by the subcarrier signal in its transmission path. Finally, it is to be noted that hue control 27 may also be interposed elsewhere in the reference oscillator circuit, for example, between burst amplifier 29 and reference oscillator 33.

In summary a constant amplitude phase shifting network has been disclosed which provides improved hue control for a color television receiver. By resorting to a DC controlled varactor in the phase shift circuit, viewer actuation of the control does not disturb any of the color signal circuits. Finally, the disclosed circuit permits a substantially greater degree of phase shift than that attainable heretofore.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

We claim:

1. In a color television receiver comprising means responsive to a composite color television signal, that includes a color subcarrier component modulated with chrominance information, for reconstituting a color image, which includes a demodulator coupled to a source of chrominance signal and to a source of color reference signal for developing a color control signal, a phase shifting network for changing the phase of one of said chrominance signal and said reference signal to adjust the hue content of said reconstituted image, said network comprising:

- a signal translating circuit having an input terminal and first and second output terminals;
- means for coupling one of said signal sources to said input terminal to apply a signal thereto and to develop first and second oppositely phased output signals at said first and second output terminals respectively;
- a phase shift circuit comprising a resistor and a reactance means coupled across said output terminals and responsive to said output signals for deriving a wave signal at the junction of said resistor and said reactance means;
- said reactance means comprising an inductance and a capacitor combination tunable near the frequency of said subcarrier;
- tuning means for changing the effective reactance contributed by said reactance means to said phase shift circuit to selectively shift the phase of said derived wave signal relative to said applied signal;
- and means for coupling said derived wave signal to said demodulator.

2. A phase shifting network as set forth in claim 1 in which said signal translating circuit comprises a transistor device.

3. A phase shifting network as set forth in claim 2 in which said first output signal is developed at the emitter terminal of said transistor and said second output signal is developed at said collector terminal.

4. A phase shifting network as set forth in claim 1 in which said capacitor comprises a varactor.

5. A phase shifting network as set forth in claim 4 in which said tuning means comprises a DC biasing circuit coupled across said varactor.

6. A phase shifting network as set forth in claim 1 in which said phase shifting network is coupled between said source of chrominance signal and said demodulator.

7. A phase shifting network as set forth in claim 1 in which said phase shifting network is included in said source of color reference signal for shifting the phase of said color reference signal prior to its application to said demodulator.

8. A phase shifting network as set forth in claim 2 in which said inductance and said capacitor are coupled in parallel with each other and in series with said resistor between the emitter and collector terminals of said transistor.

9. A phase shifting network as set forth in claim 2 in which said inductance and said capacitor and said resistor are coupled in series across the emitter and collector terminals of said transistor.